United States Patent [19]
Cohn

[11] 3,898,442

[45] Aug. 5, 1975

[54] METHODS OF AND SYSTEMS FOR SYNCHRONIZED COORDINATION OF ENERGY BALANCING AND SYSTEM TIME IN THE CONTROL OF BULK POWER TRANSFERS

[76] Inventor: Nathan Cohn, 1457 Noble Rd., Jenkintown, Pa. 19046

[22] Filed: May 7, 1974

[21] Appl. No.: 467,789

[52] U.S. Cl. .............. 235/151.21; 235/184; 307/57
[51] Int. Cl. .............................................. G06g 7/62
[58] Field of Search ............... 235/151.21, 184, 185; 307/57

[56] References Cited
UNITED STATES PATENTS
3,701,891   10/1972   Cohn .............................. 235/151.21
3,740,572   6/1973    Cohn .............................. 235/151.21

OTHER PUBLICATIONS
Cohn: Improving the Regulation of Bulk Power Transfers, North American Power Systems Interconnection Committee, Fall Meeting, Las Vegas, Nevada, Sept. 23, 1970.
Cohn: Techniques for Improving the Control of Bulk Power Transfers on Interconnected Systems, IEEE Transactions, Power and Systems, Vol. PAS-90, No. 6, Nov/Dec. 1971.
Cohn: Energy Balancing on Interconnected Systems, Proceedings of the American Power Conference, Chicago, 1973. Vol. 35.
Cohn: Control of Generation and Power Flow on Interconnected Systems Power Systems, 1966, Wiley and Sons, Inc.
Cohn: Considerations in the Regulation of Interconnected Areas, IEEE Transactions on Power Apparatus and Systems, Dec. 1967, Vol. PAS-86, No. 12.
Cohn: Bias Revisited, North American Power Systems Interconnection Committee, Spring Meeting, St. Joseph, Michigan, Apr. 9, 1970.
Ossman: Design Dilemna on Bias Control, North American Power System Interconnection, Spring Meeting in St. Joseph, Mich. Apr. 9, 1970.

*Primary Examiner*—Felix D. Gruber
*Attorney, Agent, or Firm*—Woodcock, Washburn, Kurtz & Mackiewicz

[57] ABSTRACT

In order to achieve coordinated system-wide energy balancing in the control of bulk power transfer, the system known as the net interchange tie-line bias control is modified so as to reduce inadvertent interchange while at the same time maintaining the average frequency of the interconnection as a whole at a predetermined value. This is accomplished by introducing into the control system of each area a coordinated modifying function corresponding with the quotient of the inadvertent interchange for each area measured over a span of time common to all areas divided by a constant representative of a common corrective time period for all areas, together with an additional modifying factor representative of the time integral of frequency deviation over a predetermined time period common to all areas multiplied by a bias factor common to all areas, such that a specific, unique and fixed relationship is maintained between the modifying function and the additional modifying factor.

14 Claims, 6 Drawing Figures

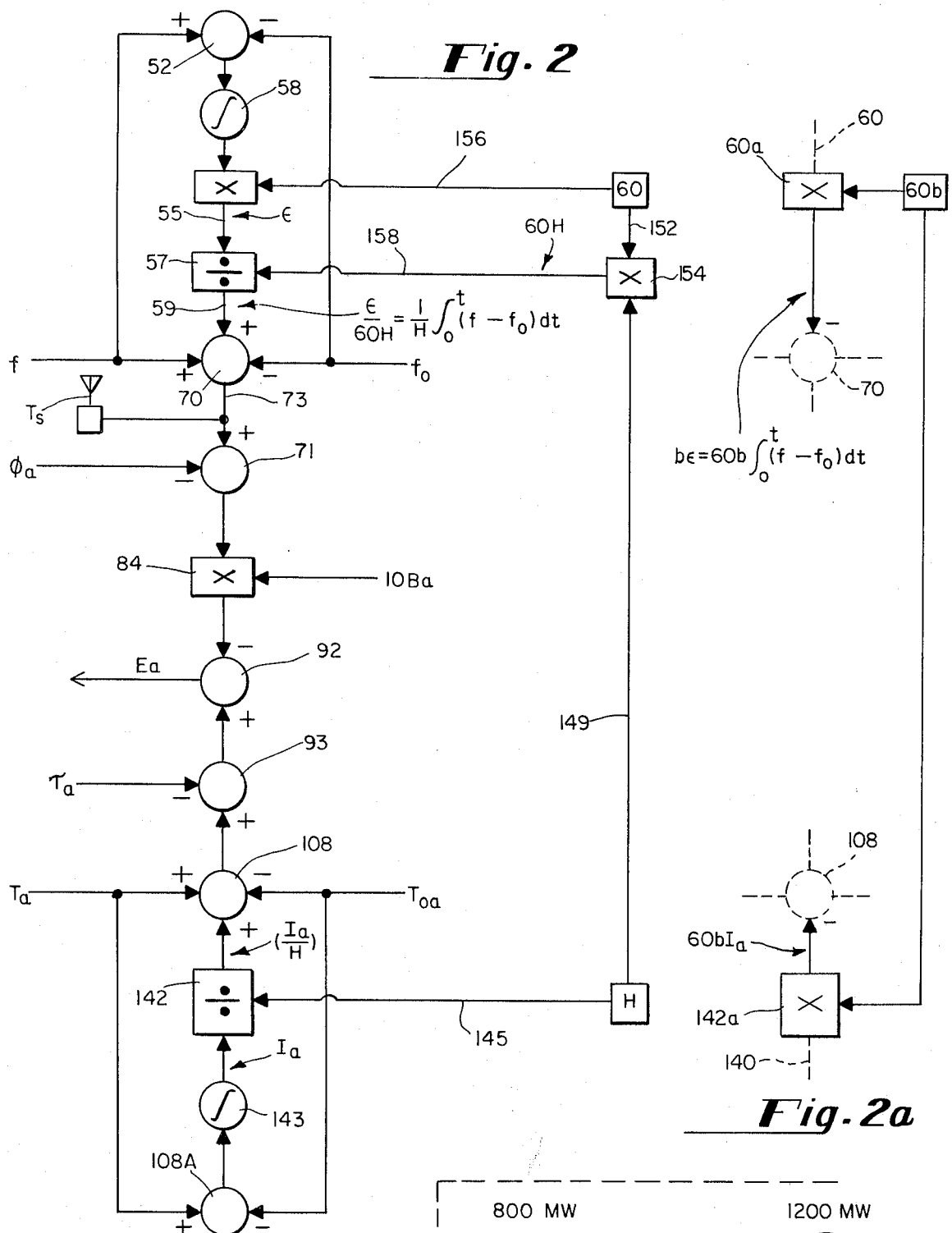
Fig. 2
Fig. 2a
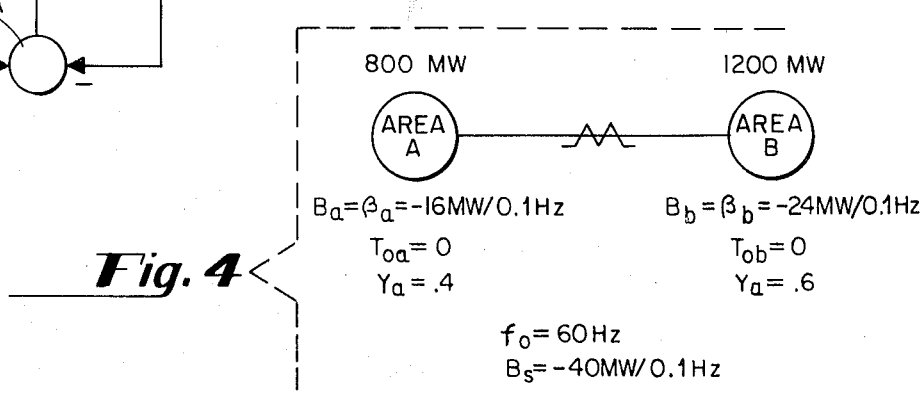
Fig. 4

METHODS OF AND SYSTEMS FOR SYNCHRONIZED COORDINATION OF ENERGY BALANCING AND SYSTEM TIME IN THE CONTROL OF BULK POWER TRANSFERS

BACKGROUND OF THE INVENTION

The most common approach to the control of the generation within each load distribution control area of an interconnected electric power system of n areas and standard reference frequency $f_o$ is the system known as net interchange tie-line bias control which operates to control the output of the generating units of each area so as to tend to maintain its area control error signal at zero when for each such control area the area control error signal is calculated in accordance with the following equation:

$$E_n = (T_n - T_{on}) - 10B_n (f - f_{on})  \qquad 1$$

where $E_n$ = the area control error, a positive control error indicating a need to reduce generation.

$T_n$ = the measured net interchange of the area in megawatts. Power flow "out" of an area is considered as positive.

$T_{on}$ = the scheduled net interchange of the area in megawatts, as preset.

$B_n$ = the frequency bias setting for the area in megawatts per 0.1 Hertz and is considered to have a minus sign.

$f$ = system frequency in Hertz.

$f_{on}$ = the system frequency schedule in Hertz, as preset.

When standard frequency is to be maintained, $f_{on} = f_o$.

The control signals which effect the change in generation of the generators are usually derived by coordinating the area control error with a number of other measured or computed parameters so that the economy and the security of the area are optimized while the area control error is being reduced to zero. A system utilizing net interchange tie-line bias control is disclosed in my U.S. Pat. No. 2,773,994, issued Dec. 11, 1956.

In accordance with Equation (1) the control action in each area is in direction to reduce its area control error $E_n$ to zero. For hypothetically perfect operation, the interconnection will automatically achieve its scheduled frequency $f_{on}$ and net interchanges will be on schedule when the control error $E_n$ for each area is zero. In order for this perfect operation to be achieved, the following criteria must be met:

1. All portions of the interconnection must be included in one area or another so that the sum of all area generation, loads and losses is the same as total system generation, load and losses.
2. The algebraic sum of all area net interchange schedules must be equal to zero.
3. The use of a common scheduled frequency $f_{on}$ for all areas, and
4. The absence of metering or computational errors.
5. Effective regulation in all areas.

Such requirements are seldom fulfilled. The reasons include the need to adjust area generation at rates which will keep pace with area load changes. The failure to do so may be the result of the characteristic of the controller or it can be caused by the pursuit in the area of an economic or security dispatch schedule which may include the addition for control purposes of sources of generation which have quite different characteristics than those under control at the time the additional sources are brought into the system. There will frequently be involved errors in frequency measurement at the several control areas together with the possibility that the predetermined or set frequency at each area may not be precisely the same. There may be errors in the measurement of net interchange or the setting of net interchange schedules. All of these factors add to the complexity of the control problem.

As the size of the interconnections has increased, the concept of inadvertent interchange has become important in the resultant control problem. As used herein, inadvertent interchange can be taken to mean the time integral of the deviation of an area's net interchange from its interchange schedule, $(T_n - T_{on})$, which is to say that inadvertent interchange $I_n$ is:

$$I_n = \int_o^t (T_n - T_{on}) \, dt \qquad 2$$

where $t$ is the span of time in hours over which $I_n$ has accumulated. Inadvertent interchange includes an "intentional" component which, when an area controls effectively, results from frequency bias action when frequency is not at its scheduled value. It includes an "unintentional" component which results from such things as meter errors, schedule setting errors, or failure of an area control system to reduce to zero the control error for an area.

Since the general practice now is for each area to make payments based not upon measurements of exchange of power as determined by the KWH meters but rather on schedule interchange, the importance of an effective system-wide control to minimize inadvertent interchange, to correct for it after it occurs, and which at the same time corrects system time-error, may be well understood.

Area inadvertent interchange accumulations and system time error develop as a result of:

1. Ineffective regulation in any of the areas of the system, identified as $E_n$ errors;
2. Errors in the measurement of frequency or in the setting of frequency schedule in any of the areas, identified in the aggregate for that area as a phi ($\phi$) error; and
3. Errors in the measurement of area net interchange or in the setting of area net interchange schedule identified in the aggregate for each areas as a tau ($\tau$) error.

Equations defining the influences of each of these causes on system frequency, system time error, area net interchange deviation from schedule, and area inadvertent interchannge accumulations are developed in my IEEE Transaction Paper No. 71TP81 - PWR entitled "Techniques for Improving the Control of Bulk Power Transfers on Interconnected Systems," presented February 1971 at the IEEE Winter Power Meeting and published in IEEE Transactions PAS 90,2409-19 (1971), and are summarized in my paper "Energy Balancing on Interconnected Systems" presented May 8, 1973, at the American Power Conference, Chicago, Illinois, and published in the APC Proceedings, Vol. 35, Fall, 1973.

My previous invention for achieving system-wide energy-balancing in the control of bulk power transfer by control actions which correct for inadvertent interchange and for time-error, all on a system-wide basis, is disclosed in U.S. Pat. No. 3,701,891. The aforesaid previous invention involves the introduction of terms in Equation (1), for each area, so as to provide system-wide correction of area inadvertent interchange accumulation and system time error accumulations as set forth in the following equation:

$$E_n = (T_n - T_{on} - \tau_n + I_n/H) - 10B_n (f - f_o - \phi_n - b\epsilon)$$

3 where $E_n$ is the area control error for area $n$ $T_n$ is the true net interchange for area $n$, in megawatts $T_{on}$ is the true net interchange schedule for area $n$, in megawatts $\tau_n$ is any error in the net interchange measurement and any error or offset in the net interchange schedule setting of area $n$, in megawatts $f$ is the true system steady state frequency, in Hz.

$f_o$ is the standard system steady state frequency schedule, in Hz.

$\phi_n$ is any error at area $n$, in the measurement of frequency, and any error or offset in the setting of frequency schedule, in Hz.

$I_n$ is the inadvertent interchange accumulation in MWH in area $n$ measured over a span of time $t$, in hours, common to all areas for the measurement of their respective inadvertent interchange H is a selected constant in hours common to all areas which represents the time period within which inadvertent interchange accumulations are to be corrected $B_n$ is the frequency-bias setting for the area in megawatts per 0.1 Hertz and is considered to have a minus sign $b$ is the time-error bias setting in Hertz per second of time error, has a negative sign, and is common to all areas;

$\epsilon$ is the system time-error in seconds accumulated in time $t$ in hours. It is common to all areas and may be written as:

$$\epsilon = 3{,}600/f_o \int_0^t (f - f_o)\, dt$$

4

When $f_o$ is 60 Hertz, this becomes:

$$\epsilon = 60 \int_0^t (f - 60)\, dt$$

5

As discussed in the afforesaid patent, the following relationships involving measurement errors and schedule setting errors and offsets apply:

$$\tau_n = T'_{on} - T_{on} - T'_n + T_n$$

6

$$\phi_n = f'_{on} - f_o - f'_n + f$$

7 where $T'_{on}$ is the value of net interchange schedule for area $n$ as actually set in the area, $T'_n$ is the net interchange for area $n$ as actually measured in the area, $f'_{on}$ is the frequency schedule as actually set in area $n$, and $f'_n$ is the system frequency as actually measured in area $n$.

Utilizing the relationships of Equations (6) and (7) in Equation (3), the following operating equation may be written:

$$E_n = (T'_n - T'_{on} + I_n/H) - 10B_n (f'_n - f'_{on} - b\epsilon)$$

8

In the application of Equation (8) to the methods and systems of the aforesaid patent, the time-period divisor, H, and the time error bias-factor, $b$, are independently selected and set, and no coordinating relationship between them is defined or provided for. As will now be discussed, by introducing in all areas of the interconnection, a specific, unique and fixed relationship between these two parameters, H and $b$, important improvements in area and system control performance not otherwise attainable are achieved.

SUMMARY OF THE INVENTION

It is accordingly an object of this invention to provide improvements in the methods of and systems for system-wide energy-balancing in the control of bulk power transfer which I disclosed in the aforesaid patent, and which corrected for inadvertent interchange and time-error on a system-wide basis, with coordination between areas, but no coordination or synchronization between inadvertent interchange correction and time-error correction.

It is a more specific object of this invention to provide the aforesaid improved methods and systems wherein control action for correction of inadvertent interchange and time-error is confined to the particular areas of the system which respectively caused said inadvertent interchange accumulations and time-error accumulations, and to achieve such corrections of inadvertent interchange and time-error in a common time span and a result of the same control action.

It is another more specific object of this invention to provide the aforesaid improved methods and systems wherein frequency-bias power assistance to an area of the system which is at fault or in need is not curtailed or denied by other areas which are in a position to supply such assistance.

It is another more specific object of this invention to provide the aforesaid improved methods and systems wherein sustained time errors and inadvertent interchange accumulations are synchronously developed so as to counter-balance sustained area and system errors while restoring frequency and net interchange flows to respective schedules.

In a preferred embodiment for carrying out the improved method and system of this invention, a multiple-area interconnected electric power system is controlled by measuring the net interchange for each area, setting the net interchange schedule for each area, determining the inadvertent interchange accumulations in each area measured over a span of time common to all areas, setting the time period common to all areas within which inadvertent interchange accumulations are to be corrected, measuring the system steady state frequency, setting the frequency-bias for each area, setting the system steady frequency schedule, determining the accumulated system time-error, and setting the time-error bias common to all areas. Control signals are then generated and utilized to regulate the generation of power in the respective areas so that the respective control signals are reduced toward zero causing each area to operate on net interchange tie-line bias control modified to correct for inadvertent interchange accumulations and time-error accumulation. The improvement comprises maintaining the time-error bias setting inversely proportional to and of opposite polarity from the time period within which inadvertent interchange accumulations are to be corrected.

BRIEF DESCRIPTION OF THE DRAWINGS

FIG. 2 is a simplified control system similar to FIG. 1 but with added elements useful in understanding the invention;

FIG. 2a is a diagrammatic representation of a modification in the control system of FIG. 2;

FIG. 4 is a diagrammatic representation of a simplified power system utilized in describing the invention in terms of numerical examples.

DESCRIPTION OF THE PREFERRED EMBODIMENTS

A multiple-area interconnected electric power system may be very extensive. In the United States, as illustrated in FIG. 7 of my paper in the "Symposium on Scheduling And Billing of Bulk Power Transfers," Proceedings of the American Power Conference, Chicago, Vol. 34, page 910, 1972, an interconnected system extends at times from coast to coast, including tielines into Canada.

Figure 3:
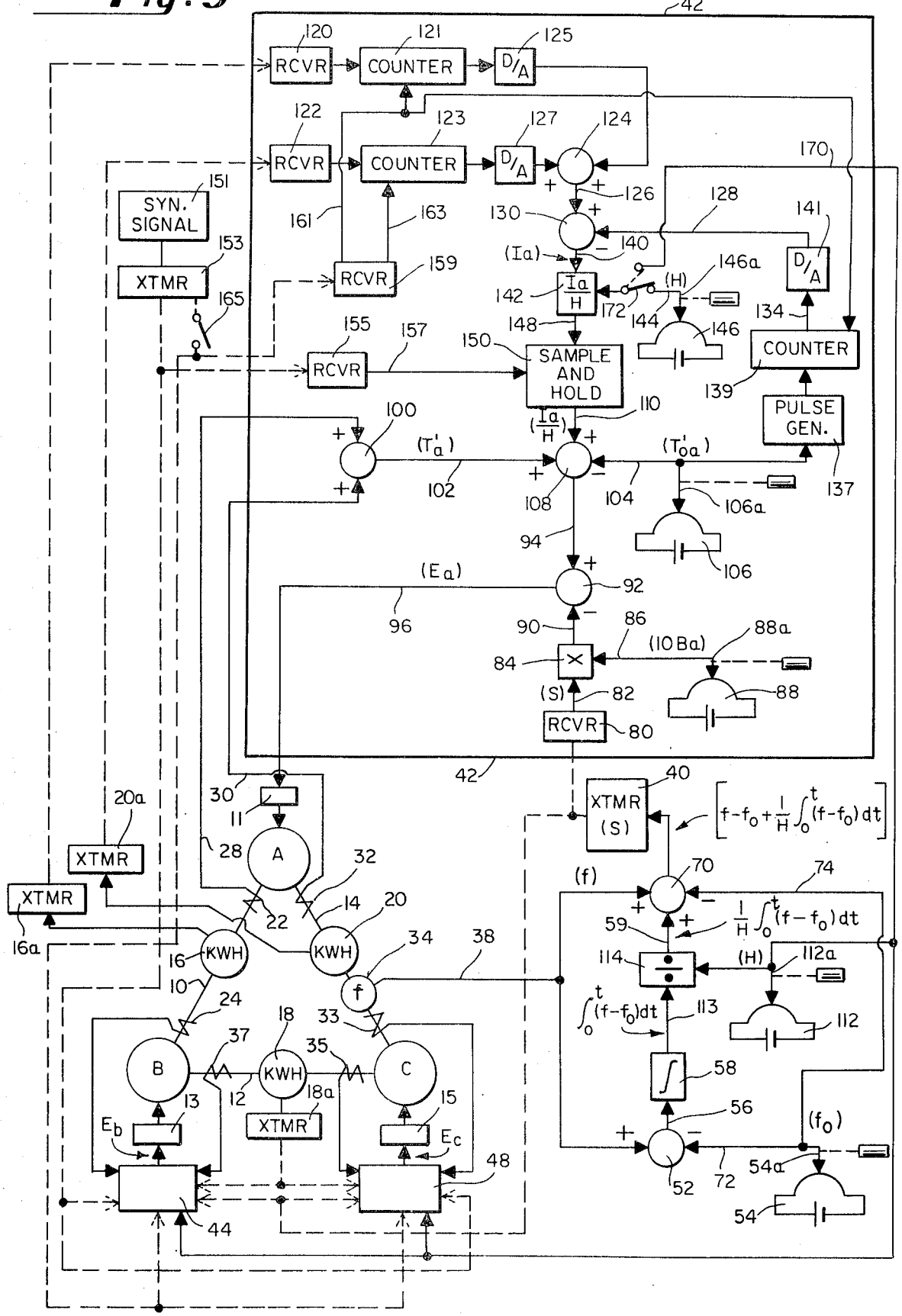
FIG. 3 is a detailed diagrammatic illustration of a mutiple-area interconnected electric power system utilizing the control system of this invention.

The principles on which my invention is based can however be well understood by reference to the simplified systems show for a single control area, Area A, in FIGS. 1, 1a, 2 and 2a and to the more complete system of FIG. 3 where control areas A, B and C have been illustrated. They are shown interconnected only by tielines 10, 12 and 14 to form an interconnection which may be taken as illustrative of a larger interconnection, with many more areas, and which may include more than one tie-line between adjacent areas.

Each of the areas will in general include a plurality of generating units interconnected to provide the necessary generation for the load in the area and also to provide the scheduled flow of power over the tie-lines interconnecting it with other areas of the system. Also, in FIG. 3, each of the areas will include its own control system 11, 13 and 15 which utilizes the modified net interchange tie-line-bias-control approach as represented by Equations (9) and (10), also (34) and (35), for distributing the generation requirements amongst the generators of each area.

The principal departure from the prior art practice involves the specific, unique and fixed relationship between the time period constant H, and the time-error bias setting, $b$, such that Equation (3) would become $$E_n = (T_n - T_{on} - \tau_n + I_n/H) - 10B_n (f - f_o - \phi_n + f_o\epsilon/3600H)$$

9

Similarly, Equation (8), incorporating the unique relationship between H and b would become:

$$E_n = (T'_n - T'_{on} + I_n/H) - 10B_n (f'_n - f'_{on} + f_o\epsilon/3,600H)$$

10

The unique relationship between H and $b$ utilized for Equations (9) and (10) is:

$$b = -f_o/3,600H.$$

11

Similarly, Equation (9) may be rewritten in terms of $b$ instead of H as:

$$E_N = (T_n - T_{on} - \tau_n - 3,600bI_n/f_o) - 10B_n (f - f_o - \phi_n - b\epsilon)$$

12 while Equation (10), similarly, may be written as:

$$E_n = (T'_n - T'_{on} - 3,600bI_n/f_o) - 10B_n (f'_n - f'_{on} - b\epsilon)$$

13

For Equations (12) and (13) the unique relationship between $H$ and $b$ is expressed as:

$$H = -f_o/3,600b$$

14

As will be later discussed, FIGS. 1, 1a, 2 and 2a embody my invention utilizing the unique relationship between H and $b$ incorporated respectively into Equations (10), (13), (9) and (12), as well as (34) and (35).

It will now be clear that the basic equations of my previous invention, Equations (3) and (8) above, have been additionally modified by the use of the specific, unique and fixed relationship between H and $b$ expressed in Equations (11) and (14) to provide Equations (9), (10), (12) and (13) which are basic to my present invention.

In the system of FIG. 3, it is assumed, for simplicity, that $f'_n$ in Equation (10) is equal to $f$, and $f'_{on}$ is equal to $f_o$ so that $\phi_n = 0$, and the applicable equation becomes:

$$E_n = (T'_n - T'_{on} + I_n/H) - 10B_n (f - f_o + f_o\epsilon/3,600H).$$

15

The system of FIG. 3 will now be described in detail. For purposes of specifically identifying the improvements over the prior art, elements of the system of FIG. 3 which are identical to the system of FIG. 3 as shown in the aforesaid U.S. Pat. No. 3,701,891 are identified with identical reference characters. Accordingly, the description of the system of FIG. 3 may be supplemented with reference to the aforesaid patent which is herein incorporated by reference.

Referring now to FIG. 3, the interconnecting tie-lines 10, 12 and 14 include KWH meters 16, 18 and 20. Such power-measuring meters are usually utilized in interconnected systems for the purpose of determining true energy interchanges between adjacent areas. In addition, individual power-measuring elements such as thermal converters 22, 24, 32, 33, 35 and 37 in the interconnecting tie-lines 10, 12 and 14 are provided. The thermal converters continuously provide signals on their output lines representative of the power flow in the tie-lines.

In addition to the measurement of the power supplied by way of interconnecting tie-lines and the measurement of the energy flow in those lines throughout a particular time period, it is also necessary to measure the frequency of the system. For this purpose, frequency meter 34 is provided. The frequency meter 34 generates a signal on line 38, which is utilized in generating a control signal, representing a correcting quantity S for each of the areas of the system, which in FIG. 3 is transmitted by a transmitter 40 to the respective area control units, e.g., units 42, 44 and 48 provided for Areas A, B and C respectively.

In the aforesaid U.S. Pat. No. 3,701,891, the quantity S is expressed as follows:

$$S = f - f_o - b\epsilon \tag{16}$$

In accordance with this invention as utilized in the embodiment of FIG. 3 and consistent with Equation (15), the quantity S may be expressed as:

$$S = f - f_o + f_o\epsilon/3{,}600H \tag{17}$$

and where $f_o$ is 60 Hertz, $$S = f - 60 + \epsilon/60H \tag{18}$$

The generation of the signal representing the correcting quantity S will now be described in detail with reference to FIG. 3. The frequency $f$ as measured by the frequency meter 34 is compared with the scheduled frequency $f_o$ at a comparator 52. The set frequency $f_o$ is obtained from the hand-set tap 54a of the potentiometer 54. The comparator 52 then provides an output on a line 56 to an integrater 58 so as to produce a signal on the line 113 representing the quantity $[\int_o^t (f-f_o) dt]$ which is proportional to the accumulated time-error $\epsilon$.

In accordance with this invention, the signal on the line 113 is then divided by a signal representing the time period H at a divider 114 where the signal H is obtained from a hand-set tap 112a of a potentiometer 112. The output signal from the divider 114 on the line 59, which represents the quantity $[1/H \int_o^t (f-f_o) dt]$ and is equal to $-b\epsilon$ is then applied to a summing unit 70.

The summing unit 70 subtracts the set frequency signal $f_o$ on a line 74 connected to the tap 54a from the sum of the measured frequency $f$ and the signal representing the quantity $[1/H \int_o^t (f-f_o) dt]$ on the line 59. The signal S from the output of the summing unit is then applied to the transmitter 40 for transmission to the unit 42 as well as the units 44 and 48 through a suitable transmission medium depicted by the dashed lines.

The operation of the control circuitry located within the block 42 associated with the Area A for generating a control signal applied to the control means 11 will now be described. The signal representing the quantity S transmitted from the transmitter 40 is received by a receiver 80. The receiver 80 provides a corresponding signal S on a line 82. A multiplier 84 then generates a signal on a line 90 representing the product of the quantity S multiplied by a quantity representing ten times the frequency-bias setting $B_a$ for the Area A. The signal representing the quantity $10B_a$ is generated by a hand-set contact 88a of a potentiometer 88. Note that the subscript n of the frequency-bias setting B in Equation (14) has been replaced with an a signifying a specific frequency-bias setting for the Area A. This same convention will be followed with respect to other signals generated by the unit 42 for controlling generation in the Area A.

The signal on the output line 90 leading from the multiplier 84 is one of the inputs to the comparator 92 which has, as its other input, a signal on a line 94 representing the deviation of the net tie-line interchange from its scheduled value plus any corrections for inadvertent interchange which are to be made. As a result of the comparison at the comparator 92, a control signal $E_a$ is produced on a line 96 which is utilized as an input to the control system 11 of the Area A.

The development of the signal on the line 94 will now be discussed. Lines 28 and 32 which are connected to the converters 22 and 32 carry signals representing the power interchange from the Area A over the tie-lines 10 and 14 respectively. The signals are added by an adder 100 so as to provide a signal $T'_a$ representing the measured net interchange for the Area A. The net interchange signal is compared with the signal $T'_{oa}$ on a line 104 which is derived from an adjustable tap 106a of a potentiometer 106 and which represents the scheduled or desired net interchange. The signals on lines 102 and 104 are then compared in a summing unit 108 which also receives a signal on a line 110 for correcting the inadvertent interchange $I_a$, namely, a signal $I_a/H$.

As will now be described, the KWH meters 16 and 20 are utilized in the generation of signals representing the inadvertent interchange. In this connection, transmitters 16a, 18a and 20a are associated with the KWH meters 16, 18 and 20 respectively. The transmitters 16a and 20a transmit signals to receivers 120 and 122 within the control system 42 which are then applied as pulses to the bi-directional counters 121 and 123 respectively. The output from the counters 121 and 123 are applied to digital-to-analog converters 125 and 127 to produce electrical signals representing the energy transferred in one direction or the other over the tie-lines. The respective outputs of the converters 125 and 127 are applied to an adder 124 which generates and applies a signal on line 126 representative of the measured net energy interchange. The signal on the line 126 is then applied to a comparator 130 which also receives a signal on a line 128 representing the quantity $T'_{oa}$ which is developed by the potentiometer 106, a pulse generator 137 and a bi-directional counter 139. A line 134 from the counter 139 applies a digital signal to a digital-to-analog converter 141 which develops the electrical signal applied to the comparator 130. The comparator 130 algebraically subtracts the signal on the line 128 from the signal on the line 126 to develop the signal on the line 140 in the form of an electrical signal which is representative of the magnitude of the inadvertent interchange $I_a$ in KWH.

The signal or quantity representing inadvertent interchange $I_a$ is now modified by the time period constant H. As shown, the value of H is preset by positioning a contact 146a of the potentiometer 146 to generate a control signal representative of the selected time period over which the correction is to take place. The output from the tap 146a is supplied to a divider 142 so as to produce a signal representing the quantity $I_a/H$ on a line 148. The signal representing the quantity $I_a/H$ is supplied to a sample-and-hold circuit 150 which is enabled or rendered operative for each area control system by a suitable source 151 of synchronizing signals applied to a transmitter 153 and then transmitted to each of the area control units 42, 44 and 48. Thus the signal received by a receiver 155 which is connected to the sample-and-hold circuit 150 through line 157 produces synchronized enabling of the sample-and-hold circuit 150. Also, as shown in FIG. 3, a receiver 159 upon closure of a switch 165 applies signals by way of line 161 and 163 to reset the counters 121, 123 and 139. The reset switch 165 will be used to set or reset the initiation of the common span time for all areas, as depicted by the broken lines.

In the prior art, the signal representing the product of the accumulated time-error $\epsilon$ and the time-error bias setting $b$ and supplied to the summation point 70 has been generated utilizing a time-error bias setting $b$ independent of the time period H within which inadvertent interchange accumulations are corrected. The product $b\epsilon$, in accordance with this invention, is generated by maintaining a specific, unique and fixed relationship between the time-error bias setting $b$ and the time period H, i.e., the time-error bias setting $b$ is inversely proportional to and of opposite polarity from the time period H. As described in the foregoing, this predetermined relationship is maintained by appropriately setting the tap 112a of the potentiometer 112 and the tap 146a of the potentiometer 146 so as to produce identical signals representing the time period H. As an alternative, the signal produced at the tap 112a may be transmitted to the control system 42 over suitable means depicted by the line 170 to a switch 172 in the line 144. When the switch is in the position shown by the dotted line, the potentiometer 146 is disconnected from the divider 142 and the time period signal H is applied to the divider 142 over the line 170. The H signal from tap 112a may also be transmitted to control systems 44 and 48 for comparable alternative use in Areas B and C.

It will therefore be understood that different means may be provided for maintaining the time-error bias setting $b$ inversely proportional to and of opposite polarity from the time period H within which inadvertent interchange accumulations are to be corrected. More particularly, various means may be provided for maintaining the specific relationship set forth in Equations (11) and (14) which will now be described with reference to the other Figures.

Figures 1, 1A:
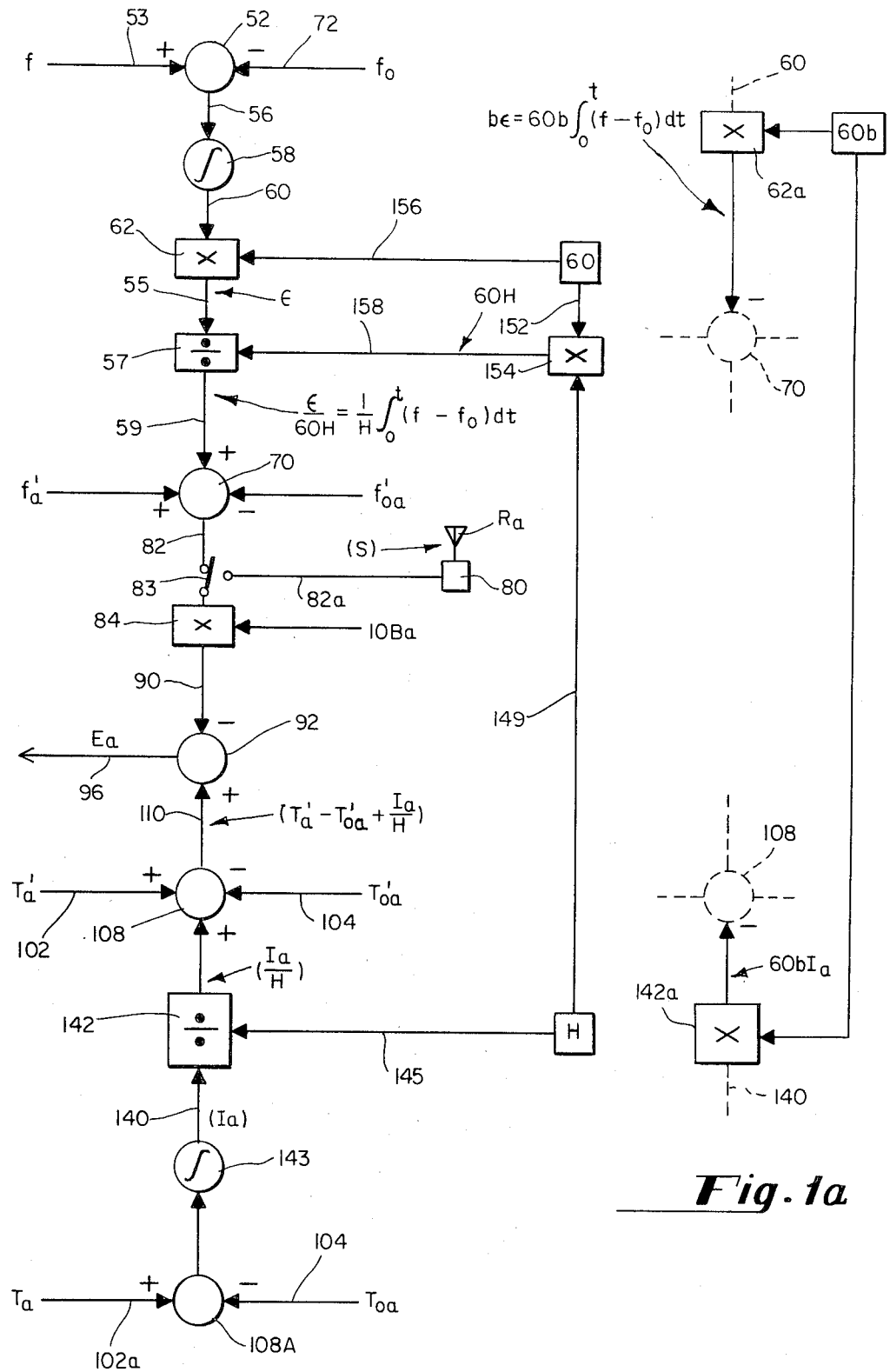
FIG. 1 is a simplified diagrammatic representation of a control system embodying the present invention.
FIG. 1a is a diagrammatic representation of a modification in the control system of FIG. 1.

As shown in FIG. 1, wherein elements which are identical to the elements of the system of FIG. 3 are identified with identical reference characters, the predetermined relationship between the time period constant H and the time-error bias setting $b$ is maintained by utilizing the source of the time period signal H, which is connected to the divider 142 by a line 145, to generate a signal $[1/H \int_o^t (f - f_o) \, dt]$ on the line 59 to the summing point 70. This is accomplished by applying the time period signal H to a multiplier 154. Simultaneously, a signal is generated representing the numerical magnitude $3,600/f_o$, which for a 60 Hz. system as shown in FIG. 1 would be the numerical quantity 60, is applied over a line 152 to the multiplier 154 and applied over a line 156 to a multiplier 62. The multiplier 154 produces a signal representing the quantity 60H on the line 158 while the multiplier 62 generates a signal representing the quantity $\epsilon$ on line 55. The signal representing the quantity $\epsilon$ is then divided by the signal representing the quantity 60H at a divider 57 so as to produce the signal representing the quantity $[1/H \int_o^t (f - f_o) \, dt]$ on the line 59.

The other elements of the system which correspond with the elements of FIG. 1 in the aforesaid patent are identified with identical reference characters. Accordingly, the portion of the detailed description relating to these elements as set forth in the aforesaid patent is incorporated herein by reference.

In the embodiment of FIG. 1a, the relationship between the time period H and the time-error bias setting $b$ is maintained by modifying the circuit of FIG. 1 as shown in solid lines. More particularly, for a 60 Hz. power system, a source of a signal of numerical magnitude 60 is connected to a multiplier 142a which replaces the divider 142 of FIG. 1. In addition, the signal representing the numerical quantity 60 is applied to a multiplier 62a which replaces multiplier 62 and the divider 57 of FIG. 1. The remainder of the system in FIG. 1a remains identical to that of FIG. 1.

In the system of FIG. 2, there are no signals representing the actual measured quantities in Area A for system frequency or net interchange, or the actual schedules set in Area A for system frequency and net interchange. Instead, it includes the true values for these parameters, with a $\phi_a$ factor which is representative of errors in frequency measurement and in frequency schedule setting, and a $\tau_a$ factor which is representative of errors in net interchange measurement and in net interchange schedule setting. Such a system, without the means for maintaining the specific, unique and fixed relationship between the time period H and time-error bias setting $b$ included in the present FIG. 2 and as described with respect to the present FIG. 1 is disclosed in FIG. 2 of the aforesaid U.S. Pat. No. 3,701,891 which is herein incorporated by reference.

FIG. 2a depicts the incorporation of the specific means for maintaining the predetermined relationship between the time period H and the time-error bias setting $b$ as described iwth respect to FIG. 1a but incorporated in the system of FIG. 2.

The manner in which said specific, unique and fixed relationship between H and $b$ adds operating advantages to my said previous invention will now be discussed and illustrated with quantitative examples.

In my aforementioned IEEE Paper No. 71TP81, there are developed equations for relating deviations in system frequency and area net interchange power flow to regulating errors, frequency measuring or schedule setting errors, and net interchange measuring or schedule setting errors, when all areas of an interconnected system operate on net interchange tieline bias control modified with $I_n/H$ and $b\epsilon$ factors as in Equation (3), and H and $b$ respectively are common to all areas.

For the frequency deviation, the applicable equation is as follows:

$$\Delta f = - \sum_{n=1}^{N} (Y_n/10B_n) [E_n + (\tau_n - I_n/H) - 10B_n (\phi_n + b\epsilon)] \qquad (19)$$

where
- $\Delta f$ is the deviation of frequency from schedule, and is equal to $(f - f_o)$, and
- $Y_n$ is the size ratio of area $n$, and is equal to the ratio of the area frequency-bias, $B_n$, to the summation of all area frequency-biases, $B_s$.

For area net interchange power flow deviation, the applicable equation is as follows:

$$\Delta T_n = (1 - Y_n)[E_n + (\tau_n - I_n/H) - 10B_n(\phi_n + b\epsilon)]$$
$$- Y_n \sum_{\substack{i=1 \\ i \neq n}}^{N} [E_i + (\tau_i - I_i/H)]$$
$$+ 10B_n \sum_{\substack{i=1 \\ i \neq n}}^{N} Y_i(\phi_i + b\epsilon) \quad (20)$$

where
- $\Delta T_n$ is the deviation of area net interchange from schedule in area $n$, and is equal to $(T_n - T_{on})$, and
- $i$ is the subscript defining parameters for all areas of the interconnected system except area $n$.

Inspection of Equations (19) and (20) will reveal two important characteristics as provided by my earilier invention, U.S. Pat. No. 3,701,891, namely:

1. The introduction of net interchange schedule offsets representative of $-I_n/H$ respectively in all areas will, when there are no $E$, $\tau$ or $\phi$ errors, and the algebraic sum of all such offsets is zero, provide the desired correction for inadvertent interchange in each area, and will do so without introducing a system frequency deviation.

2. The introduction of frequency schedule offsets representative of $b\epsilon$ in all areas will, when there are no $E$, $\tau$ or $\phi$ errors, provide the desired offset in system frequency to correct accumulated time error and will do so without introducing deviations in area net interchange schedules.

Thus there is coordination between areas in the correction of inadvertent interchange on the one hand, and correction of system time error on the other. But, there is no coordination or synchronization between the two, so that in the process of correcting both, the corrective control action is not necessarily assigned to the areas that caused the inadvertent interchange accumulations and the time-error accumulation, and assistance to an area then at fault or in need can be diminished.

This will now be illustrated.

Consider the simplified two-area interconnected system of FIG. 4. Area A is assumed to have a spinning capacity of 800 MW, with a frequency-bias $B_a$ of $-16$ MW/0.1 Hz., assumed to be equal to its frequency response $\beta_a$. Area B is assumed to have a spinning capacity of 1,200 MW, with a frequency-bias $B_b$ of $-24$ MW/0.1 Hz., assumed to be equal to its frequency response $\beta_b$. Thus the size ratio for Area A, $Y_a$, is 0.4, for Area B, $Y_b$, it is 0.6.

The sizes selected, and the conditions to be explored are intended to be illustrative only, to demonstrate the nature of results obtained. Comparable results would be obtained for comparable conditions on multiple-area interconnected systems with quantitative parameters differing in magntidue and time scale from these assigned to FIG. 4 and its illustrative examples.

Example I

Let the system of FIG. 4 start with balanced conditions of frequency at its 60 Hz. schedule, and net interchange between areas at the agreed upon schedule of zero, which is to say $$f = f_o = 60 \text{ Hz.}, T_a = T_{oa} = 0, T_b = T_{ob} = 0, \epsilon = 0, I_a = 0, \text{ and } I_b = 0.$$

Let a load of 40 MW now be added to Area A, and let there be no further load changes at either Area A or Area B for the full term of this example. The initial effect of the 40 MW load addition would be to cause a drop in frequency. The combined frequency response of the system is $\beta_a + \beta_b$, or 40 MW/0.1 Hz. The frequency drop would therefore be 0.1 Hz., and the 40 MW load increase would be accomodated by a 16 MW governing increment from Area a and a 24 MW governing increment from Area B. The 24 MW contribution from Area B would appear on the tie line to Area A.

Let each area be equipped for conventional net interchange tie-line bias control per Equation (1). However, note that before any control action is taken at either area, the following conditions, assuming no measurable lapse of time, now apply:

$$f = 59.9, T_a = -24 \text{ MW}, T_b = +24 \text{ MW}, \epsilon = 0, I_a = 0, \text{ and } I_b = 0.$$

Assume no $\tau$ or $\phi$ errors at either area.

Let the control at Area B now be turned on. Any necessary control action at Area B is defined by the magnitude of $E_b$ in Equation (1), thusly:

$$E_b = (+24 - 0) - 10(-24)(59.9 - 60) = +24 - 24 = 0$$

Thus, since the frequency bias $B_b$ was made equal to the frequency response $\beta_b$, no control action is required at Area B, and 24 MW of assistance will continue to be supplied to Area A as long as prevailing conditions apply.

Assume now that the control system at Area A is inoperative and remains so for a period of time $t$. To keep the computations simple, assume that $t$ is equal to 1 hour. During this period, the control signal at Area A, per Equation (1) remains:

$$E_a = (-24-0) - 10(-16)(59.9-60) = -24-16 = -40$$

The minus sign of $E_a$ signifies a need to increase generation at Area A, to displace the incoming assistance from Area B, but since Area A control is inoperative, this action does not occur. At the end of the hour, prevailing conditions then are:

$$f = 59.9, T_a = -24 \text{ MW}, T_b = +24 \text{ MW}$$
$$\epsilon = -6 \text{ sec.}, I_a = -24 \text{ MWH}, I_b = +24 \text{ MWH.}$$

Now let the I/H and $b\epsilon$ factors be inserted into the control at each area, so that Equation (3), with no $\tau$ or $\phi$ errors, applies. Before any further control action occurs at either area, the prevailing control signal errors are calculated, letting $H = 1$ and $b = 0.01$ Hz. per second of time error, yielding: $E_a = [-24-0+(-24)/1] - 10(-16)[59.9-60-(-0.01)(-6)] = -73.6$, indicating a need to increase generation.

$E_b = (+24-0+24/1) - 10(-24)[59.9-60-(-0.01)(-6)] = +9.6$, indicating a need to decrease generation.

As a first observation, it will be noted that control action including that for the correction of inadvertent interchange and time error accumulations is being assigned not only to Area A, which because of its earlier failure to regulate is responsible for the inadvertent interchange and time error accumulations, but also to Area B, which is not responsible for the occurrence of these accumulations.

As a second observation, if Area A is still not able to control, then Area B, in responding to its $E_b$ signal will, as a result of its decrease in generation, be withdrawing in part the assistance it has been supplying to Area A. It will be doing so at a time when Area A is still in need. In short, Area B will be giving a higher priority to inadvertent interchange correction than to sustaining its frequency-bias assistance to an area in need. The magnitude of the assistance withdrawal after the control at area B has acted to reduce $E_b$ to zero, but with no control action at Area A, will now be calculated.

From Equation (3) for Area B, using the $\Delta T$ and $\Delta f$ symbology as earlier defined:

$E_b = 0 = (\Delta T_b + 24) - 10(-24)[\Delta f - (-0.01)(-6)]$ or, $$-\Delta T_b = 9.6 + 240\Delta f$$

but, $$\Delta T_a = -\Delta T_b,$$

thus, $$\Delta T_a = 9.6 + 240\Delta f \qquad 21$$

At Area A, the 40 MW load increase is accommodated by the frequency response increase in generation at Area A, $\Delta G_a$, and the incoming net interchange, $\Delta T_a$, so that $$40 = \Delta G_a - \Delta T_a$$

but, $$\Delta G_a = 10\beta_a(\Delta f) = -160\Delta f$$

so, $$40 = -160\Delta f - \Delta T_a \qquad 22$$

Solving Equations (21) and (22), $$\Delta T_a = -20.16.$$

The assistance from Area B to Area A, though Area A is still in need, has thus been decreased from 24 MW to 20.16 MW. For smaller values of $b$, the withdrawal would be greater, assistance vanishing when $b = 0$.

Now let control act at both areas, to reduce both $E_a$ and $E_b$ to zero. Calculating the resultant system frequency from Equation (19) yields:

$\Delta F = (-0.4/-160)[0-(-160)(-0.01)(-6)] - (0.6/-240)[0-(240)(0.01)(-6)] = +0.06$ Hz.

The frequency will thus be raised to 0.06 Hz. above schedule or to 60.06 Hz., so that the prevailing time error will be reduced.

As the next step, calculate prevailing $T_a$ and $T_b$, from Equation (20), thusly $\Delta T_a = (1-0.4)[0-(-24/1)-10(-16)(-0.01)(-6)] -0.4[0+24/1] + 10(-24)(0.6)(0.1)(-6) = +24$ MW And similarly;

$$\Delta T_b = -24 \text{ MW}$$

Thus a new area net interchange has been established which will reduce inadvertent interchange accumulations. At the end of one hour of such operation, inadvertent interchange in each area will have been reduced to zero, but time error will not yet have been fully corrected, and would be at $$\epsilon = -6+60(0.06)(1) = 2.4 \text{ seconds.}$$

Assuming, as until now, that there are no further load changes on the system, and both areas continue to regulate effectively, the time correction period would have to be continued to ultimately reduce the still prevailing time error accumulation to zero.

To summarize Example I, then, coordination between areas for correction of inadvertent interchange and time errror accumulations has been achieved, but it is to be noted that in doing so, 1. control action has been assigned to an area that did not cause the inadvertent interchange or time error accumulations, 2. assistance to an area at fault has been withdrawn, and 3. the corrections for inadvertent interchange and time error were not synchronized, occurring in different time spans.

Coordinating the H and b factors as shown in FIGS. 1, 1a, 2, 2a and 3 will result in, 1. control action for correction of inadvertent interchange and time error accumulations being assigned only to areas that caused the accumulations, thereby reducing overall system regulation requirements and improving economy of operation 2. giving priority to ongoing power assistance to areas at fault or in need and will not curtail or deny such assistance from areas in a position to supply it, and 3. will synchronize the corrections for inadvertent interchange and time error accumulations, so that both occur in the same time span and as a result of the same control action These advantages of the unique relationship between the H and b factors disclosed in this invention are demonstrated in Examples II and III, which follow.

EXAMPLE II

In FIG. 4, conditions and parameters will be as in Example I, except that with $H = 1$, the magnitude of $b$, from Equation (11) will be $-1/60$.

With a load increase of 40 MW at Area A, and no further load changes at either area during the full course of the example, conditions immediately after the frequency response action at both areas will, as before, be:

$f = 59.9$ Hz., $T = -24$ MW, $T_b = +24$MW, $\epsilon = 0$, $I_a = 0$, and $I_b = 0$.

Let the control at Area B now be turned on, and assuming no $\tau$ or $\phi$ errors at either area, Equation (1), as in Example I, will show $E_b = 0$, and 24 MW of assistance will continue to be supplied to Area A, whose control is to remain inoperative for 1 hour. Prevailing conditions after the hour, and as in Example I, are:

$f = 59.9$ Hz., $T_a = -24$ MW, $T_b = +24$ MW $\epsilon = -6$ sec., $I_a = -24$MWH, $I_b = +24$ MWH Now let the I/H and $b\epsilon$ factors be inserted into the control at each area, so that Equation (3), with no $\tau$ or $\phi$ errors, applies, but noting that now $b = -1/60$ as per Equation (11) instead of $-0.01$ as in Example I.

Before any control action at either area, control signals, $E_n$, are calculated, thusly:

For Area A:

$$E_a = (-24-0+(-24/1)) - 10(-16)[59.9-60-(-1/60)(-6)] = -80$$

For Area B:

$$E_b = (24-0+24/1) - 10(-24)[59.9-60-(-1/60)(-6)] = 0$$

Now it will be seen that, by utilizing the unique relationship of $b$ to H, control action has been assigned to Area A while, in contrast to Example I, no control action is assigned to Area B. Thus, control action has been assigned only to the area responsible, because of its earlier failure to regulate, for the accumulations of inadvertent interchange and time error.

This was a stated objective of my invention.

Next, it will be seen that with no control action at Area B resulting from the introduction of the correlated modifying factors I/H and $b\epsilon$, and with Area A still not regulating, the previously established frequency-bias assistance of 24 MW from Area B to Area A will continue to flow undiminished. This was another stated objective of my invention.

Now let control of both areas act to reduce both $E_a$ and $E_b$ to zero. Calculating the resultant system frequency from Equation (19) yields:

$$\Delta f = (-0.4/-160) - [0-24-(-160)(-1/60)(-6)] \\ (-0.6/-240) [0+24-(-240)(-1/60)(-6)] = +0.1 \text{ Hz.}$$

The frequency is thus raised to 60.1 Hz., so that prevailing time error will be reduced:

Now calculate prevailing $T_a$ and $T_b$ from Equation (20), thusly:

$$\Delta T_a = (1-0.4)[0-(-24/1)-10(-16)(-1/60)(-6)] \\ -0.4[0-24/1] + 10(-24)(0.4)(-1/60)(-6) = 24 \text{ MW}$$

and similarly:

$$\Delta T_b = -24 \text{ MW}$$

Thus a new net interchange of 24 MW from Area A to Area B has been established, which will reduce the inadvertent interchange accumulations. At the end of one hour of each operation, inadvertent interchange in each area will have been reduced to zero.

It will be interesting to see what has concurrently happened to this same hour to the previously accumulated time error. With frequency at 60.1 Hz., the time deviation accumulated in the hour would be, per Equation (4), 60(0.1)(1) or +6 seconds, which, algebraically combined with the previous hour's accumulation of −6 seconds, would result in a net time error of zero.

Thus another characteristic of my invention, synchronized correction of inadvertent interchange and time error accumulations in the same time span has been demonstrated.

The influence of measurement and schedule setting errors on the creation of inadvertent interchange and time error accumulations, and on corrective control action taken in accordance with my invention will now be explored in Example III.

EXAMPLE III

With Areas A and B as in FIG. 4, assume starting conditions as before, namely:

$f = f_o = 60$, $T_a = T_{oa} = 0$, $T_b = T_{ob} = 0$, $I_a = 0$, $I_b = 0$,
$\epsilon = 0$.

Now, instead of a load increase at Area A, let there be a sustained $\tau$ error at Area A of +40 MW, and no other $\tau$ or $\phi$ errors on the system. Before any control action at either area, control signals, from Equation (3), will be:

For Area A $$E_a = (0-0-40+0) - 10(-16)(60-60-0-0) = -40$$

For Area B $$E_b = (0-0-0+0) - 10(-24)(60-60-0-0) = 0$$

To begin with, then, control action to increase generation is required at Area A, and no control action is required at Area B. With the requisite control action completed at Area A so that $E_a$ becomes zero, the effect on system frequency as given by Equation (19) is:

$$\Delta f = -(0.4/-160)(0+40)-(0.6/-200)(0) = +0.1 \text{ Hz.}$$

Frequency has been raised to 60.1 Hz., causing a positive time error accumulation.

Now, calculate net interchange between Area A and Area B, using Equation (20)

$$\Delta T_a = (1-0.4)(0+40) - 0.4(0) = +24 \text{ MW}$$

Similarly, $$\Delta T_b = -24 \text{ MW}$$

Inadvertent interchange begins to accumulate in both areas.

At the end of 1 hour of such operation: $T_a = 24$ MW, $T_b = -24$ MW, $f = 60.1$ Hz., $I_a = +24$ MNH, $I_b = -24$ MWH, $\epsilon = +6$ seconds.

Now add I/H and $b\epsilon$ factors to the controls of both areas, letting $H = 1$, and $b$, per Equation (11), equal to $-1/60$ Hz. per second of time error. Before any control action occurs at either area, calculate the magnitude of control errors per Equation (9):

For Area A
$E_a = (24-0+24) - 10(-16)[60.1-60-(-1/60)(6)]$
$= +80$, indicating a need to reduce generation
$E_b = (-24-0-24) - 10(-24)[60.1-60-(1/60)(6)]$
$= 0$, indicating no control action required.

Again, it has been shown that control action has been assigned only to the area, Area A, responsible for the inadvertent interchange and time error accumulations. Now let Area A regulate to reduce $E_a$ to zero. Calculate the magnitude of system frequency deviation using Equation (19):

$$\Delta f = -(0.4/-160)[0+40-40-(-160)(-1/60)(6)] \\ -(0.6/-240)[0-(-40)-(-240)(-1/60)(6)] = 0$$

Frequency, in other words, has been restored to schedule, 60 Hz.

Now, calculate the net interchange deviations, from Equation (20):

For Area A $$\Delta T_a = (1-0.4)[0+40-24-10(-16)(-1/60)(6)] = 0$$

Similarly, for Area B $$\Delta T_b = 0$$

Net interchange, in other words, between Area A and Area B has been restored to schedule, namely zero.

The return to schedule of system frequency and area net interchange despite the prevalence of a sustained $\tau$ error at one of the areas has been accomplished by the automatic development of sustained inadvertent interchange and system time error accumulations which compensate for the existence of the $\tau$ error. This was another stated objective of my invention.

Such compensation or counter-balancing would be comparably achieved for a $\phi$ error, or for errors in the computation of inadvertent interchange, or for combinations of such $\tau$ or $\phi$ or inadvertent interchange errors. The magnitude for the sustained time error, $\epsilon_r$, and the inadvertent interchange accumulations, $I_{rn}$, required to thus automatically compensate for such prevailing errors when all areas are regulating effectively, can each be defined by a general equation which will now be derived.

Add Equations (9) for all areas, yielding:

$$\Sigma E_n = \Sigma T_n - \Sigma T_{on} - \Sigma \tau_n + \Sigma I_n/H - 10B_s$$
$$[f-f_o+f_o(\epsilon/3,600H)] + \Sigma\ 10(B_n\ \phi_n)$$

23

By definition, $\Sigma E_n = 0$, $\Sigma T_n = 0$, $\Sigma T_{on} = 0$. Also, $\epsilon$ is to have such value as will cause $(f-f_o)$ to be zero. For that condition, designating $\epsilon$ as $\epsilon_r$, $$\epsilon_r = [360/(f_o B_2)][\Sigma I_n - H(\Sigma \tau_n + 10\ \Sigma B_n\ \phi_n)]$$

24

Applying Equation (24) to the 60 Hz. system of Example III, with $H=1$, $B_s=0$, $-40$, $\Sigma I_n =$ , $10\ \Sigma(B_n\ \phi_n) = 0$, $\Sigma \tau_n = +40$, yields $\epsilon_r$ equal to +6 seconds, as earlier calculated.

For each area, the general equation for $I_{rn}$ may be derived from Equations (9) and (24), and will read as follows:

$$I_{rn} = H[\tau_n - 10B_n\phi_n - Y_n(\Sigma\tau_n - 10\Sigma B_n\phi_n)] + Y_n\Sigma I_n$$

25

For Example III, for Area A, this reduces to:

$$I_{ra} = +24\ \text{MWH},$$

which checks the numerical value automatically achieved in the example.

Equations (24) and (25) are thus representative of the sustained levels of system time error and area inadvertent interchange accumulations that will automatically be established by control operating in accordance with my invention in compensation for the aforementioned $\tau$, $\phi$, or I errors.

It will be now of interest to show the general derivation of the H and b relationship of Equations (11) and (14).

The $b\epsilon$ term of Equation (3) may be written:

$$b\epsilon = [b\ (3,600)/f_o] \int_o^t (f-f_o)dt$$

26

The $-10B_n(-b\epsilon)$ factor of Equation (3) may therefore be written as:

$$-10B_n(-b\epsilon) = -10B_n(-b3,600/f_o)\ \int_o^t (f-f_o)dt$$

27

The $I_n/H$ factor of Equation (3) may be written as:

$$I_n/H = 1/H\ \int_o^t(T_n - I_{on})dt$$

28

When an area regulates effectively, responding to its own load changes, and providing programmed frequency-bias assistance to other areas and has no $\tau$ or $\phi$ errors of its own, its frequency-bias assistance to other areas, defined by Equation (1), is:

$$T_n - T_{on} = 10B_n\ (f - f_o)$$

29

For the stated conditions, substituting Equation (29) in Equation (28):

$$I_n/H = (10B_n/H)\ \int_o^t (f-f_o)dt$$

30

In order, in Equation (9), for the term of Equation (27) to counter balance the term of Equation (30), so that no control action will be undertaken in the area to correct for inadvertent interchange and time error accumulations caused by other areas, it is necessary that the said two terms be equal in magnitude of opposite algebraic sign. That is to say:

$$10B_n(-b3,600/f_o)\ \int_o^t (f-f_o)dt = (10B_n/H)\ \int_o^t (f-f_o)dt$$

31 or $$-10B_n(b3,600/f_o) = 10B_nH$$

32 and $b = -f_o/3,600H$, which is Equation (11).

For a 60 Hz. system:

$$b = -1/60H$$

33

It will be noted also that Equation (9) may be written, as is done partially in FIGS. 1, 1a, 2, 2a and 3, as:

$$E_n = [T_n - T_{on} - \tau_n + (1/H)\ \int_o^t(T_n-T_{on})dt]$$
$$-10B_n[f-f_o-\phi_n+1/H\ \int_o^t(f-f_o)dt]$$

34 and may also be written as:

$$E_n = [T_n - T_{on} - \tau_n - (3,600b/f_o)\ \int_o^t(T_n-T_{on})dt$$
$$-10B_N[f-f_o-\phi_n-(3,600b/f_o)\ \int_o^t(f-f_o)dt$$

35

In FIG. 3, power flow between areas is measured by pairs of thermal converters 22 and 24 on the AB line 10, 32 and 33 on the AC line 14, and 35 and 37 on the BC line 12. It will be understood that each said pair of converters should preferably be located close together on their respective line so there will be no unmetered line loss between them. As an alternative embodiment, a single converter or equivalent power flow measuring device on the tie-line can be used to transmit power flow data to the corresponding two areas thereby minimizing the possibility of $\tau$ errors.

Also, FIG. 3 shows the development of an S signal at one location, and its transmission from that location to the various areas. Alternatively, the S signal can be developed at each local area as shown for Area A in FIG. 1 when switch 83 is in the position illustrated therein.

Although the numerical examples which have been discussed have each considered, for clarity, a single load change or prevailing error in a single area of a two area system, it will be understood that my invention will be comparably effective when there are large numbers of load changes and prevailing errors occurring in many interconnected areas, as are encountered in actual power systems operations.

It will be evident to those skilled in the art that the analog control previously described may be modified so as to include a combination of digital and analog control circuitry. In the alternative, the analog control may be replaced by a digital computer control system.

While particular embodiments of the invention have been shown and described and various modifications suggested, it will be understood that other embodiments and modifications thereof may be made without departing from the principles of this invention. The appended claims are, therefore, intended to cover any such embodiments and modifications which fall within the true spirit and scope of the invention.

What is claimed is:

1. An improved control system for a multiple-area interconnected electric power system including means for measuring the net interchange for each area, means for setting the net interchange schedule for each area, means for determining the inadvertent interchange accumulations in each area measured over a span of time common to all areas; means for setting the time period common to all areas within which inadvertent interchange accumulations are to be corrected, means for setting the frequency bias for each area, means for measuring the system steady state frequency, means for setting the system steady state frequency schedule, means for setting the time-error bias common to all areas, means for determining the accumulated system time-error, means coupled to the aforesaid means for generating control signals for the respective areas, and regulating means responsive to the control signals to regulate the generation of power in the respective areas so that the respective control signals are reduced toward zero causing each area to operate on net interchange tie-line bias control modified to correct for inadvertent interchange accumulations and time-error accumulation, the improvement comprising:

means for maintaining the time-error bias setting inversely proportional to and of opposite polarity from the time period within which inadvertent interchange accumulations are to be corrected such that correction of inadvertent interchange and time-error is substantially confined to the particular areas of the system which respectively caused the inadvertent interchange accumulations and time-error accumulations, frequency-bias power assistance to an area of the system which is at fault or in need is not curtailed or denied by other areas which are in a position to supply such assistance, the average interchange of power over the tie-lines interconnecting the areas, when there are no prevailing net interchange measuring or schedule setting errors or frequency measuring or schedule setting errors and no prevailing errors in determining area inadvertent interchange and no regulating errors, is substantially maintained on a predetermined schedule so as to reduce toward zero accumulated inadvertent interchange, and simultaneously in the same time span, the average frequency of the system as a whole is substantially maintained so as to reduce toward zero accumulated time-error, and the accumulated inadvertent interchange of each area, when there are prevailing net interchange measuring or schedule setting errors or frequency measuring or schedule setting errors or prevailing errors in determining area inadvertent interchange but no regulating errors, is substantially maintained at a predetermined and unique value and simultaneously in the same time span, the accumulated time error of the system as a whole is substantially maintained at a predetermined and unique value as will, for each area and for the system as a whole, counterbalance the effects of said prevailing errors, and will cause area power interchanges and system frequency to return to and be substantially maintained at their respective scheduled values.

2. The improved control system of claim 1, wherein the time error bias in Hz. per second is maintained substantially equal to and of opposite polarity from the standard system frequency divided by the product of 3,600 and the time period, expressed in hours, within which inadvertent interchange accumulations are to be corrected, when the power quantities are expressed in megawatts, energy quantities in megawatt hours, frequency quantities in Hz., time error in seconds, and the frequency bias in megawatts per 0.1 Hz.

3. The improved control system of claim 1, wherein the time error bias expressed in reciprocal hours is maintained substantially equal to and of opposite polarity from the reciprocal of the time period, expressed in hours, within which inadvertent interchange accumulations are to be corrected, when the power quantities are expressed in megawatts, energy quantities in megawatt hours, frequency quantities in Hz., time error as the time integral of the frequency deviation in Hz. hours, and the frequency bias in megawatts per 0.1 Hz.

4. An improved control system for a multiple-area interconnected electric power system including local means for measuring the net interchange for each area, local means for setting the net interchange schedule for each area, local means for determining the inadvertent interchange accumulations in each area measured over a span of time common to all areas; local means for setting the time period common to all areas within which inadvertent interchange accumulations are to be corrected, local means for setting the frequency bias for each area, central means for measuring the system steady state frequency, central means for setting the system steady state frequency schedule, central means for setting the time-error bias common to all areas, central means for determining the accumulated system time-error, central means for broadcasting for use in each area a broadcast signal representing the system steady state frequency, the system steady state frequency schedule, the time-error bias common to all areas and the accumulated system time-error, means coupled to the aforesaid local means and responsive to said broadcast signal for generating control signals for the respective areas, and regulating means responsive to the control signals to regulate the generation of power in the respective areas so that the respective control signals are reduced toward zero causing each area to operate on net interchange tie-line bias control modified to correct for inadvertent interchange accumulations and time-error accumulation, the improvement comprising:

means for maintaining the time-error bias setting inversely porportional to and of opposite polarity from the time period within which inadvertent interchange accumulations are to be corrected such that correction of inadvertent interchange and time-error is substantially confined to the particular areas of the system which respectively caused the inadvertent interchange accumulations and time-error accumulations, frequency-bias power assistance to an area of the system which is at fault or in need is not curtailed or denied by other areas which are in a position to supply such assistance, the average interchange of power over the tie-lines interconnecting the areas when there are no prevailing net interchange measuring or schedule setting errors or frequency measuring or schedule setting errors and no prevailing errors in determining area inadvertent interchange and no regulating errors, is substantially maintained on a predetermined schedule so as to reduce toward zero accumulated inadvertent interchange, and simultaneously in the same time span, the average frequency of the system as a whole is substantially maintained so as to reduce toward zero accumulated time-error, and the accumulated inadvertent interchange of each area, when there are prevailing net interchange measuring or schedule setting errors or frequency measuring or schedule setting errors or prevailing errors in determining area inadvertent interchange but no regulating errors, is substantially maintained at a predetermined and unique value and simultaneously in the same time span, the accumulated time error of the system as a whole is substantially maintained at a predetermined and unique value as will, for each area and for the system as a whole, counterbalance the effects of said prevailing errors, and will cause area power interchanges and system frequency to return to and be substantially maintained at their respective scheduled values.

5. The improved control system of claim 4 wherein the improvement further comprises central means for transmitting a signal representing the time period within which inadvertent interchange accumulations are to be corrected to each of said local means for setting the time period common to all areas within which inadvertent interchange accumulations are to be corrected.

6. The improved control system of claim 4, wherein the time error bias in Hz. per second is maintained substantially equal to and of opposite polarity from the standard system frequency divided by the product of 3,600 and the time period, expressed in hours, within which inadvertent interchange accumulations are to be corrected, when the power quantities are expressed in megawatts, energy quantities in megawatt hours, frequency quantities in Hz., time error in seconds, and the frequency bias in megawatts per 0.1 Hz.

7. The improved control system of claim 4, wherein the time error bias expressed in reciprocal hours is maintained substantially equal to and of opposite polarity from the reciprocal of the time period expressed in hours, within which inadvertent interchange accumulations are to be corrected, when the power quantities are expressed in megawatts, energy quantities in megawatt hours, frequency quantities in Hz., time error as the time integral of the frequency deviation in Hz. hours, and the frequency bias in megawatts per 0.1 Hz.

8. An improved method of controlling a multiple-area interconnected electric power system including the steps of measuring the net interchange for each area, setting the net interchange schedule for each area, determining the inadvertent interchange accumulations in each area measured over a span of time common to all areas, setting the time period common to all areas within which inadvertent interchange accumulations are to be corrected, setting the frequency bias for each area, measuring the system steady state frequency, setting the system steady state frequency schedule, setting the time-error bias common to all areas, determining the accumulated system time-error, generating signals representing the aforesaid measurements, settings and determinations or combinations thereof, generating control signals for the respective areas in response to the aforesaid signals, and automatically regulating the generation of power in the respective areas so that the respective control signals are reduced toward zero causing each area to operate on net interchange tie-line bias control modified to correct for inadvertent interchange accumulations and time-error accumulation, the improvement comprising the additional step of:

maintaining the time-error bias setting inversely proportional to and of opposite polarity from the time period within which inadvertent interchange accumulations are to be corrected.

9. The improved method of claim 8 including the step of substantially confining the correction of inadvertent interchange and time-error to the particular areas of the system which respectively caused the inadvertent interchange accumulations and time-error accumulations.

10. The improved method of claim 8 including the step of preventing the curtailment or denial of frequency-bias power assistance to an area of the system which is at fault or in need by other areas which are in a position to supply such assistance.

11. The improved method of claim 8 including the step of, when there are no prevailing net interchange measuring or schedule setting errors or frequency measuring or schedule setting errors and no prevailing errors in determining area inadvertent interchange and no regulating errors, substantially maintaining the average interchange of power over the tie-lines interconnecting the areas on a predetermined schedule so as to reduce toward zero accumulated inadvertent interchange, and simultaneously in the same time span, substantially maintaining the average frequency of the system as a whole so as to reduce toward zero accumulated time-error.

12. The improved method of claim 8 comprising the additional step of, when there are prevailing net interchange measuring or schedule setting errors or frequency measuring or schedule setting errors or prevailing errors in determining area inadvertent interchange but no regulating errors, substantially maintaining the accumulated inadvertent interchange of each area at a predetermined and unique value and simultaneously and in the same time span, substantially maintaining the accumulated time error of the system as a whole at a predetermined and unique value as will, for each area and for the system as a whole, counterbalance the effects of said prevailing errors, and will cause area power interchanges and system frequency to return to and be maintained at their respective scheduled values.

13. The improved method of claim 8 wherein the time error bias in Hz. per second is maintained substantially equal to and of opposite polarity from the standard system frequency divided by the product of 3,600 and the time period, expressed in hours, within which inadvertent interchange accumulations are to be corrected, when the power quantities are expressed in megawatts, energy quantities in megawatt hours, frequency quantities in Hz., time error in seconds, and the frequency bias in magawatts per 0.1 Hz.

14. The improved method of claim 8, wherein the time error bias expressed in reciprocal hours is maintained substantially equal to and of opposite polarity from the reciprocal of the time period, expressed in hours, within which inadvertent interchange accumulations are to be corrected, when the power quantities are expressed in megawatts, energy quantities in megawatt hours, frequency quantities in Hz., time error as the time integral of the frequency deviation in Hz. hours, and the frequency bias in megawatts per 0.1 Hz.

* * * * *

UNITED STATES PATENT OFFICE
CERTIFICATE OF CORRECTION

Patent No. 3,898,442     Dated August 5, 1975 -

Inventor(s) Nathan Cohn     Page 1 of 3

It is certified that error appears in the above-identified patent and that said Letters Patent are hereby corrected as shown below:

| | |
|---|---|
| Fig. 4 | Under the Area B circle, for "$Y_a = .6$" read $Y_b = .6$ |
| Col 2 Line 38 | For "schedule" read --scheduled-- |
| Col 2 Line 53 | For "areas" read --area-- |
| Col 3 Line 55 | For "afforesaid" read --aforesaid-- |
| Col 6 Line 21 | For "$E_N$" read --$E_n$-- |
| Col 6 Line 26 | For "$3,600bI_n f_o$" read --$3,600bI_n/f_o$-- |
| Col 10 Line 50 | For "iwth" read --with-- |
| Col 12 Line 29 | For "Area a" read --Area A-- |
| Col 13 Line 3 | For "b = 0.01" read --b = -0.01-- |
| Col 14 Line 5 | For "[0+24/1]" read --[0-24/1]-- |
| | For "(-24)" read --(-16)-- |
| | For "(0.1)" read --(-0.01)-- |
| read | The corrected second line of this computation will now $-0.4[0-24/1] + 10(-16)(0.6)(-0.01)(-6) = +24$ MW |
| Col 14 Line 15 | For "= 2.4 seconds" read -- = -2.4 seconds-- |
| Col 14 Line 62 | For "T= -24 MW" read --$T_a$ = -24 MW-- |
| Col 15 Lines 40 & 41 | For "(-0.4/-160)-" read -- (-0.4/-160) -- |
| | For "0-24" read -- 0+24 -- |
| | For "(-0.6/-240)" read -- + (-0.6/-240) -- |
| | For "0+24" read -- 0-24 -- |

UNITED STATES PATENT OFFICE
CERTIFICATE OF CORRECTION

Patent No. 3,898,442    Dated August 5, 1975

Inventor(s) Nathan Cohn    Page 2 of 3

It is certified that error appears in the above-identified patent and that said Letters Patent are hereby corrected as shown below:

Col 15
Lines 40 & 41    The complete calculation will then read:
$$\Delta f = (-0.4/-160) [0+24-(-160)(-1/60)(-6)] + (-0.6/-240) [0-24-(-240)(-1/60)(-6)] = +0.1 \text{ HZ}$$

Col 15 Line 47    For "+10(-24)(0.4)" read -- +10(-16)(0.6) --

Col 15 Line 55    For "each" read --such--

Col 15 Line 58    For "happened to" read --happened in--

Col 16 Line 30    For "(0.6/-200)" read -- (0.6/-240) --

Col 16 Line 43    For "MNH" read --MWH--

Col 16 Line 53    For "(1/60)(6)" read -- (-1/60)(6) --

Col 16
Lines 61 & 62    For "+40-40" read -- +40-24 --
                 For "(-40)" read -- (-24) --

UNITED STATES PATENT OFFICE
CERTIFICATE OF CORRECTION

Patent No. 3,898,442                  Dated August 5, 1975

Inventor(s) Nathan Cohn

Page 3 of 3

It is certified that error appears in the above-identified patent and that said Letters Patent are hereby corrected as shown below:

Col 17 Line 36   In Equation 24, for "$(f_o B_2)$" read --$(f_o B_s)$--
                                  for " +10 " read -- -10 --

Col 17 Line 40   For ", $B_s = 0, -40, \Sigma I_n = ,$" read --, $B_s = -40, \Sigma I_n = 0,$--

Col 18 Line 10   For "$I_{on}$" read --$T_{on}$--

Col 18 Line 33   For "magnitude of" read --magnitude and of--

Col 18
Lines 62 & 63    Add a closing bracket, ], at the end of each of these line Col 18 Line 63   For "$B_N$" read --$B_n$--

Signed and Sealed this

*twenty-fifth* Day of *May 1976*

[SEAL]

Attest:

RUTH C. MASON                         C. MARSHALL DANN
Attesting Officer                     Commissioner of Patents and Trademarks